US006823457B1

(12) United States Patent
Berstis et al.

(10) Patent No.: US 6,823,457 B1
(45) Date of Patent: Nov. 23, 2004

(54) METHOD AND SYSTEM FOR VERIFYING CONTROL ACCESSES BETWEEN A DEVICE ON A NON-PROPRIETARY BUS AND A DEVICE ON A PROPRIETARY BUS

(75) Inventors: Viktors Berstis, Austin, TX (US); George Willard Van Leeuwen, Rochester, MN (US); Steven Michael Pritko, Endicott, NY (US); Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/444,617

(22) Filed: Nov. 22, 1999

(51) Int. Cl.[7] .................................................. H04K 1/00
(52) U.S. Cl. ........................ 713/182; 713/182; 713/166; 713/172; 713/200; 380/262; 380/264; 380/268; 701/1; 701/36; 455/3.06
(58) Field of Search ............................. 713/182; 701/1, 701/36, 32; 705/13

(56) References Cited

U.S. PATENT DOCUMENTS

| | | | | |
|---|---|---|---|---|
| 5,459,660 A | * | 10/1995 | Berra | 701/33 |
| 5,765,027 A | * | 6/1998 | Wang et al. | 710/40 |
| 6,011,486 A | * | 1/2000 | Casey | 340/7.29 |
| 6,023,565 A | * | 2/2000 | Lawman et al. | 716/1 |
| 6,041,045 A | * | 3/2000 | Alterman et al. | 370/313 |
| 6,118,938 A | * | 9/2000 | Lawman et al. | 716/16 |
| 6,150,961 A | * | 11/2000 | Alewine et al. | 340/995.1 |
| 6,161,066 A | * | 12/2000 | Wright et al. | 701/36 |
| 6,212,635 B1 | * | 4/2001 | Reardon | 713/165 |
| 6,314,422 B1 | * | 11/2001 | Barker et al. | 707/10 |
| 6,389,538 B1 | * | 5/2002 | Gruse et al. | 713/194 |
| 6,499,106 B1 | * | 12/2002 | Yaegashi et al. | 713/193 |
| 6,574,734 B1 | * | 6/2003 | Colson et al. | 713/200 |
| 6,581,161 B1 | * | 6/2003 | Byford | 713/182 |
| 2003/0014536 A1 | * | 1/2003 | Christensen et al. | 709/238 |

* cited by examiner

Primary Examiner—Ayaz Sheikh
Assistant Examiner—Syed A. Zia
(74) Attorney, Agent, or Firm—Leslie A. Van Leeuwen; Dillon & Yudell LLP

(57) ABSTRACT

A method for verifying control accesses between a device on a non-proprietary bus and a device on a proprietary bus is disclosed. A gateway controller is connected between a proprietary bus and a non-proprietary bus. A determination is made as to whether or not a non-proprietary device is registered to more than one gateway controller. In response to a determination that the non-proprietary device is registered to more than one gateway controller, another determination is made as to whether or not the non-proprietary device is a portable device. In response to a determination that the non-proprietary device is a portable device, another determination is made as to whether or not a number of acceptable duplication has been exceeded. In response to a determination that the number of acceptable duplication has been exceeded, a flag is set to indicate a control access violation has occurred.

18 Claims, 4 Drawing Sheets

METHOD AND SYSTEM FOR VERIFYING CONTROL ACCESSES BETWEEN A DEVICE ON A NON-PROPRIETARY BUS AND A DEVICE ON A PROPRIETARY BUS

BACKGROUND OF THE INVENTION

1. Technical Field

The present invention relates to a method and system for data processing in general, and in particular to a method and system for providing data communications between two independent buses within a data processing system. Still more particularly, the present invention relates to a method and system for verifying control accesses between a device on a non-proprietary bus and a device on a proprietary bus within a data processing system.

2. Description of the Prior Art

A proprietary bus is a bus that is intended for the private use of an original equipment manufacturer (OEM), and access to a proprietary bus is generally restricted in order to limit any liability from actions that may be caused by inappropriate commands being sent on the proprietary bus. One example of a proprietary bus is the Controller Area Network (CAN) bus. The CAN bus is an ISO-defined serial communications bus that was originally developed during the late 1980's for the automotive industry. The basic design specification of the CAN bus calls for a high bit-rate, a high immunity to electrical interference, and an ability to detect any errors produced. Not surprisingly, the CAN bus rapidly came to be widely used throughout the automotive and aerospace industries over the years, mainly due to the above-mentioned advantageous features.

The CAN communications protocol, which conforms with the layered configuration defined by the Open Systems Interconnection (OSI) model, describes the method by which data are passed between devices coupled to the CAN bus. The CAN architecture defines the lowest two layers as a data-link layer and a physical layer. The application layers are linked to the physical medium by the layers of various emerging protocols, which may be specific to a particular industry or propriety schemes defined by individual CAN users.

The present disclosure describes a method and system for verifying control accesses from a device on a non-proprietary bus to a device on a proprietary bus, such as a CAN bus.

SUMMARY OF THE INVENTION

In accordance with a preferred embodiment of the present invention, a gateway controller is connected between a proprietary bus and a non-proprietary bus. A determination is made as to whether or not a non-proprietary device is registered to more than one gateway controller. In response to a determination that the non-proprietary device is registered to more than one gateway controller, another determination is made as to whether or not the non-proprietary device is a portable device. In response to a determination that the non-proprietary device is a portable device, another determination is made as to whether or not a number of acceptable duplication has been exceeded. In response to a determination that the number of acceptable duplication has been exceeded, a flag is set to indicate a control access violation has occurred.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is applicable to a variety of data processing systems employing at least two independent buses. In addition, the data processing system may be a stand-alone system or part of a network such as a local-area network (LAN) or a wide-area network (WAN). For the purpose of illustration, a preferred embodiment of the present invention, as described below, is implemented on a vehicle environment employing two separate internal vehicle buses.

Figure 1:
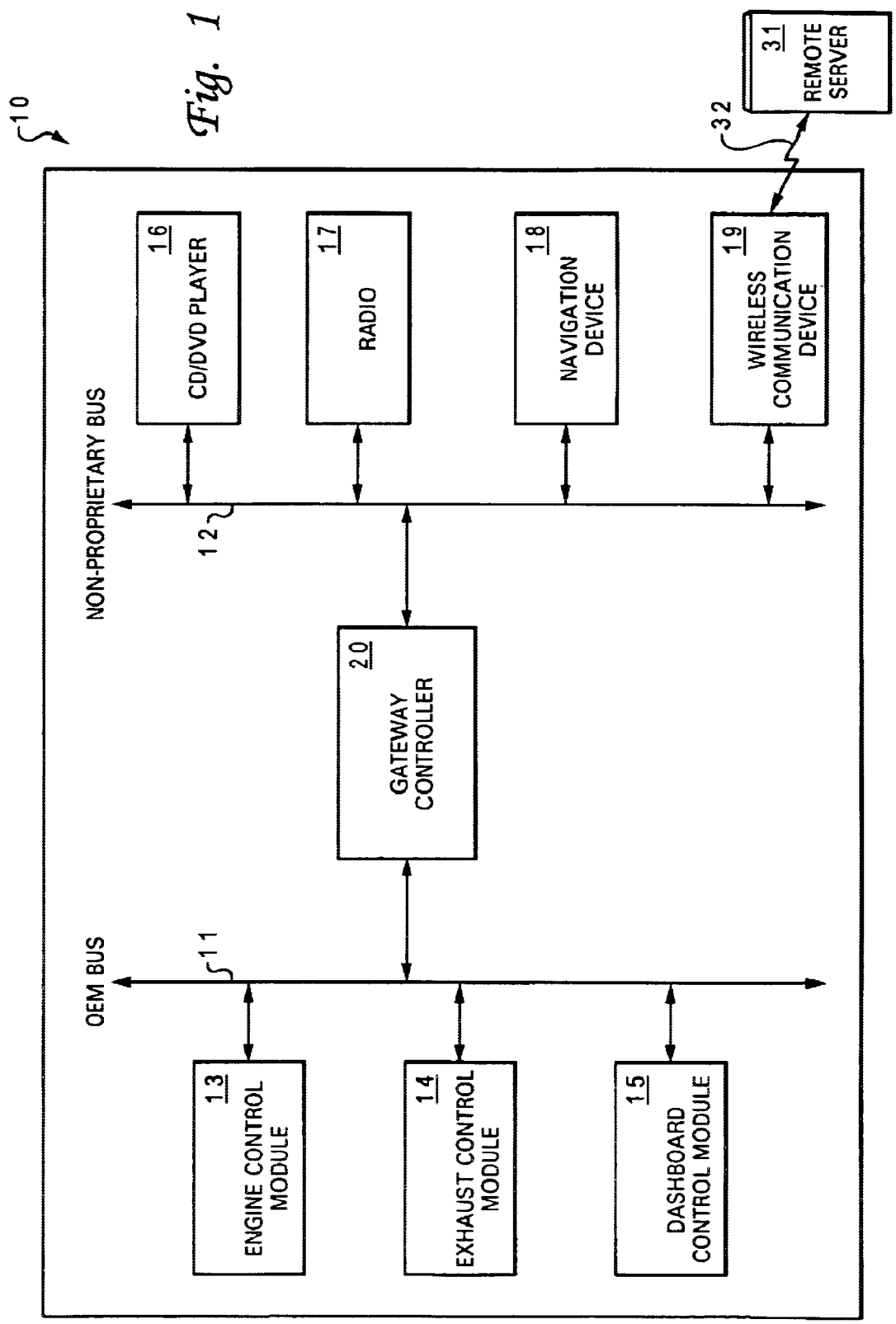
FIG. 1 is a block diagram of a vehicle environment having two internal vehicle buses, in accordance with a preferred embodiment of the present invention.

Referring now to the drawings and in particular to FIG. 1, there is depicted a block diagram of a vehicle environment having two separate internal vehicle buses, in accordance with a preferred embodiment of the present invention. As shown, within a vehicle environment 10, an original equipment manufacturer (OEM) bus 11 is coupled to a non-proprietary bus 12 via a gateway controller 20. OEM bus 11, such as a CAN bus mentioned previously, is a proprietary bus to which various control components that are crucial to the operations of the vehicle are coupled. These control components include, for example, an engine control module 13, an exhaust control module 14, and a dashboard control module 15, as shown in FIG. 1. Components on OEM bus 11, such as control modules 13–15, can communicate with each other via messages which preferably take the form of commands. OEM bus 11 is typically restricted from access by non-registered users. In fact, it is commonly the desire of an automobile manufacturer to limit accesses to OEM bus 11 only to certain privileged parties. This is, in part, to limit any liability from actions that may be caused by inappropriate commands communicated on OEM bus 11.

Non-proprietary bus 12 is an internal vehicle bus to which various components that are not crucial to the operations of the vehicle are coupled. These non-crucial components include, for example, a CD/DVD player 16, a radio 17, a navigation device 18, and a wireless communication device 19, as shown in FIG. 1. Non-proprietary bus 12 is intended for general public access. An example of non-proprietary bus 12 is the Intelligent Transportation Systems (ITS) data Bus. Details regarding the ITS data bus can be found in SAE J2366-2 ITS Data Bus Link Layer Recommended Practice, Aug. 31, 1999; SAE J2366-4 ITS Data Bus Thin Transport Layer Recommended Practice, Aug. 30, 1999; and SAE J2366-7 ITS Data Bus Application Message Layer Recommended Practice, Aug. 30, 1999, which are incorporated herein by reference.

Wireless communication device 19 is a special device that has the ability to securely communicate with a remotely located server 31 by means of an airlink 32 provided by an appropriate wireless service such as OnStar® communication service offered by General Motors Corporation of Detroit, Mich. In addition, there is also a secure communications link between wireless communication device 19 and gateway controller 20. Thus, messages sent from wireless communication device 19 can be trusted by gateway controller 20.

In some situations, a device connected to non-proprietary bus 12 may want to communicate with a device on OEM bus 11. For example, navigation device 18 may want to send vehicle direction information to dashboard control module 15 such that the vehicle direction information can be displayed on a dashboard for the driver of the vehicle. In accordance with a preferred embodiment of the present invention, a device connected to non-proprietary bus 12 has to follow certain registration protocols and communication protocols in order to communicate to a device on OEM bus 11 via gateway controller 20.

Figure 2:
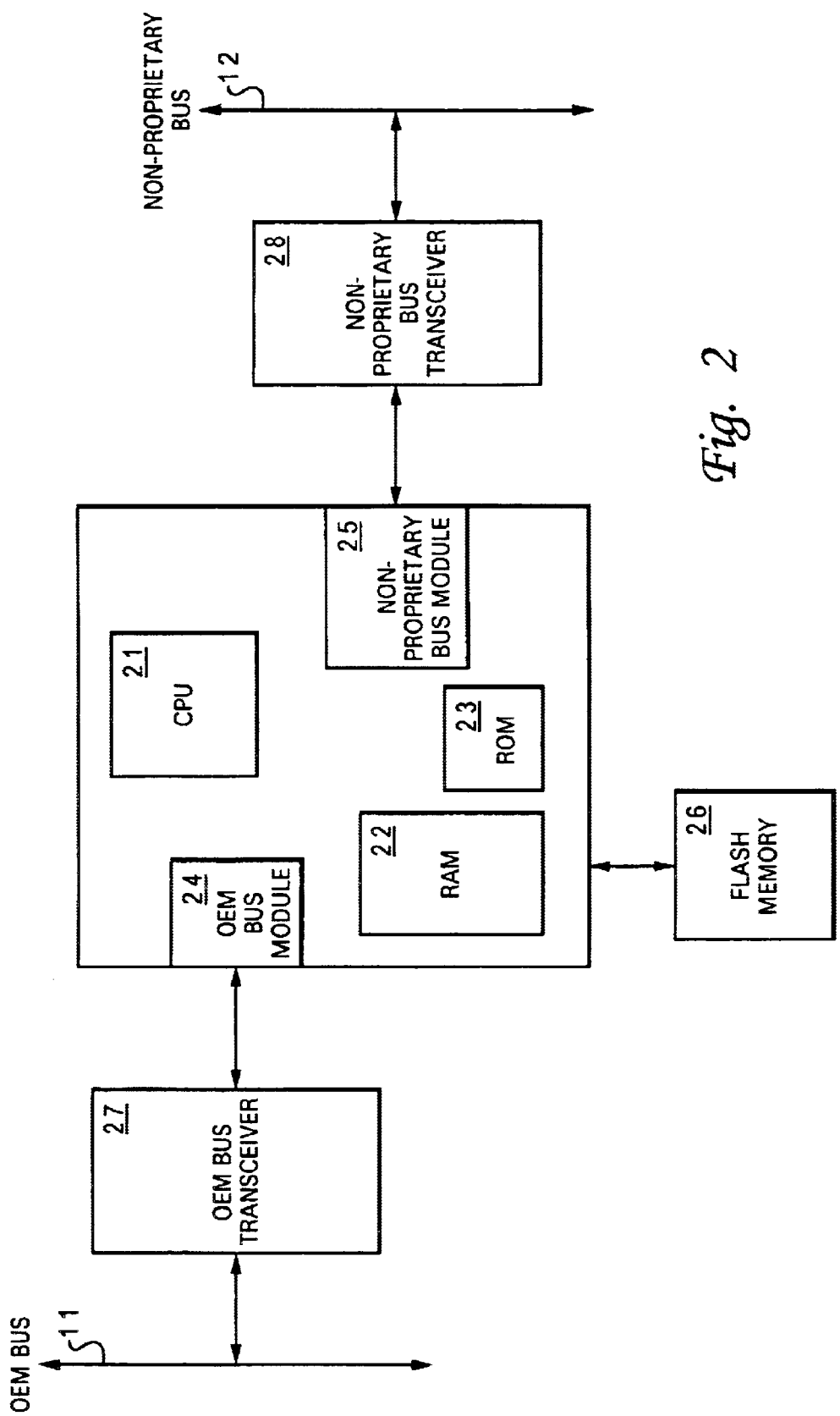
FIG. 2 is a detailed block diagram of the gateway controller from FIG. 1, in accordance with a preferred embodiment of the present invention.

With reference now to FIG. 2, there is depicted a detailed block diagram of gateway controller 20, in accordance with a preferred embodiment of the present invention. Gateway controller 20 is preferably a microcontroller that permits certain messages to be sent between a device on non-proprietary bus 12 and a device on OEM bus 11. As shown, gateway controller 20 includes a central processing unit 21, a random access memory (RAM) 22, a read only memory (ROM) 23, an OEM bus module 24, and a non-proprietary bus module 25. A flash memory 26 may also be externally coupled to gateway controller 20 for additional storage space. OEM bus 11 is coupled to gateway controller 20 via an OEM bus transceiver 27, and non-proprietary bus 12 is coupled to gateway controller 20 via a non-proprietary bus transceiver 28. As mentioned previously, one function of gateway controller 20 is to limit any access to OEM bus 11 only to certain licensed devices on non-proprietary bus 12, and only for approved messages and/or commands. Access is controlled via a secure registration process described here below.

A. Device Manufacturing Process

An agreement is initially made between the vehicle manufacturer and a device manufacturer, such as a navigation device manufacturer, intended to license the access of OEM bus 11. The agreement includes a set of messages, preferably in the form of commands, to be sent and received by a device expected to be installed on non-proprietary bus 12. For a batch of devices to be manufactured, the device manufacturer supplies to the vehicle manufacturer a group of information packets. Each information packet corresponds to a separate device, and each information packet comprises a device vendor identification, a device identification, a device serial number, and a manufacturing date. After receiving the information packets from the device manufacturer, the vehicle manufacturer then computes an unique identification packet (ID packet) for each device by adding a random number to an information packet associated with the device. The computed batch of ID packets are subsequently sent back to the device manufacturer. During the manufacturing process, each device is programmed with an unique ID packet. In addition, the computed batch of ID packets are also encrypted via a one-way encryption algorithm by the vehicle manufacturer. After verifying that each of the encrypted ID packets is globally unique, the vehicle manufacturer stores the encrypted ID packets are in server 31.

B. Device Registration Process

A device, such as a navigation device, manufactured by a licensed navigation device manufacturer is typically installed into a vehicle. However, for certain mobile devices, such as a portable CD player, the end user may install the mobile devices every time the end user uses the vehicle. Regardless, a device needs to registered with gateway controller 20 that is coupled to non-proprietary bus 12, if the device on non-proprietary bus 12 desires to communicate with any device on OEM bus 11.

Each device on non-proprietary bus 12 is requested to send its ID packet, the contents of which have been described previously. Gateway controller 20 then checks whether the ID packet has already been listed in a table of registered devices stored in its secure storage devices, such as ROM 23 or flash memory 26. If the ID packet is listed, then the device registration is complete. Otherwise, the device is considered a new device that needs to be registered.

The registration process begins with gateway controller 20 sending the ID packet of the device and the ID packet of gateway controller 20 to wireless communication device 19. Gateway controller 20 then requests wireless communication device 19 to register the device. Wireless communication device 19 in turn communicates with remote server 31 (e.g., the vehicle manufacturer's server) and securely transmits the above-mentioned two ID packets to remote server 31. At remote server 31, the two ID packets are verified to determine if they are part of the known set of assigned ID packets. The database entry for gateway controller 20 in remote server 31 is then updated to indicate a registration of the device, if this is the first time registration for the device. Specifically, the server database entry for the device is updated to indicate that the device is registered to gateway controller 20.

Next, remote server 31 returns a confirmation of registration to wireless communication device 19 along with a bitmap indicating gateway controller 20 messages that the device is authorized to send and receive messages to and from OEM bus 11. Furthermore, if this was the first time registration for the device, an appropriate license fee can be collected from the device manufacturer, via an electronic method or otherwise.

At this point, wireless communication device 19 can securely send gateway controller 20 a device registration confirmation along with a permitted messages bitmap indicating the messages the device is allowed to use. If the device was not successfully registered, a permitted messages bitmap filled with zeros is provided. Additional message can be added to indicate the reason why the device was not registered. Gateway controller 20 places the ID packet of the device and the permitted messages bitmap into a permitted messages bitmap table preferably stored in flash memory 26. If the device was not registered, gateway controller 20 will refuse to handle any messages from the device. This is again accomplished by storing a zero-filled permitted messages bitmap for the entry of the device.

Figure 3:
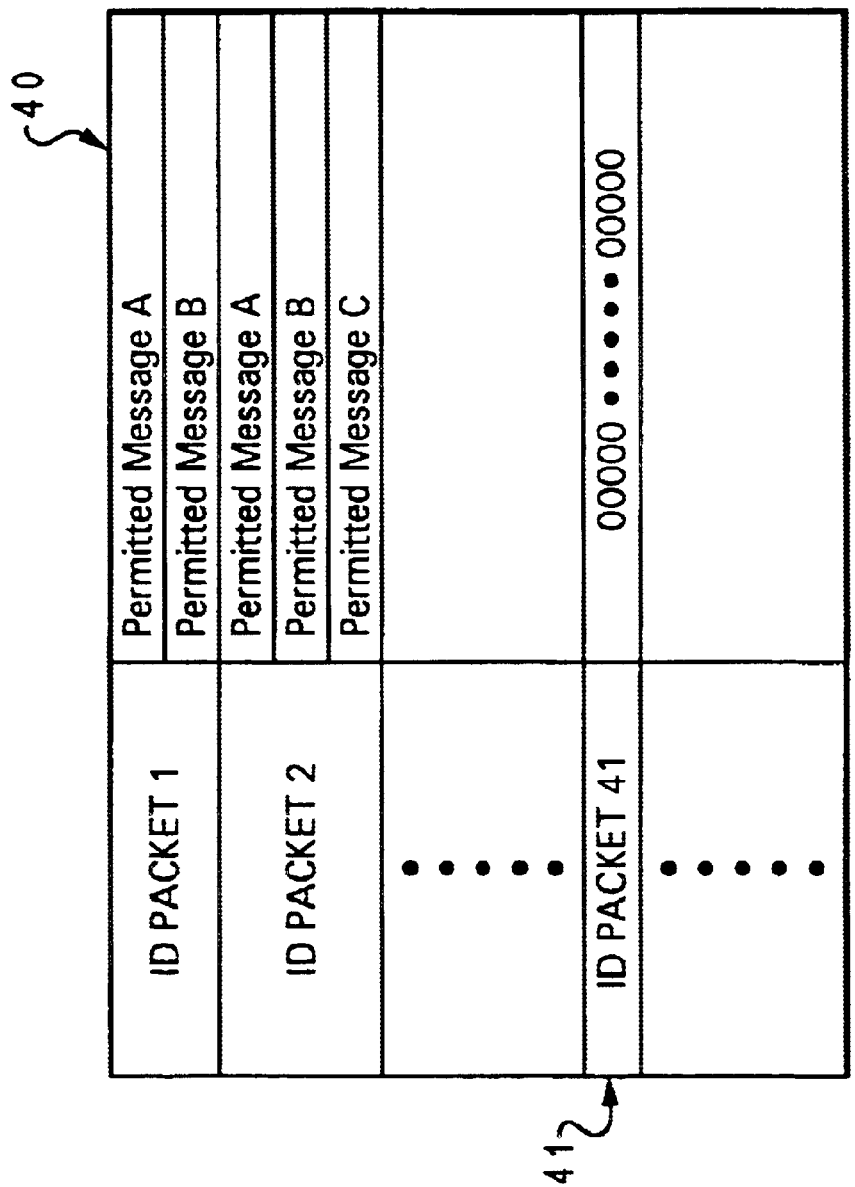
FIG. 3 is an exemplary permitted messages bitmap table in accordance with a preferred embodiment of the present invention.

An example of a permitted messages bitmap table is depicted in FIG. 3. As shown, a permitted messages bitmap table 40 contains multiple entries of ID packets and permitted messages bitmaps. Each ID packet entry is associated with at least one permitted message. If a device was not successfully registered, a zero-filled permitted messages bitmap is provided, as depicted in entry 41 for ID packet 41.

C. Device De-registration Process

At some point, a device may be temporarily or permanently removed from the vehicle. The device then needs to be de-registered with gateway controller 20.

If a device listed in flash memory 26 becomes defective or has been removed from the vehicle, then the device de-registration becomes applicable. If the device is not a portable device, then its entry is simply removed from flash memory 26. If the device is a portable device, such as a removable CD player, then a time notation is made in flash memory 26 to indicate the device is currently not present. If the device has not been present for a predetermined amount of time (e.g., two weeks), then its entry will be removed from flash memory 26. Periodically (e.g., every month) or at random times (e.g., when the link to wireless communication device 19 is active), gateway controller 20 can communicate to remote server 31 to verify the list of currently registered devices maintained by gateway controller 20.

Figure 4:
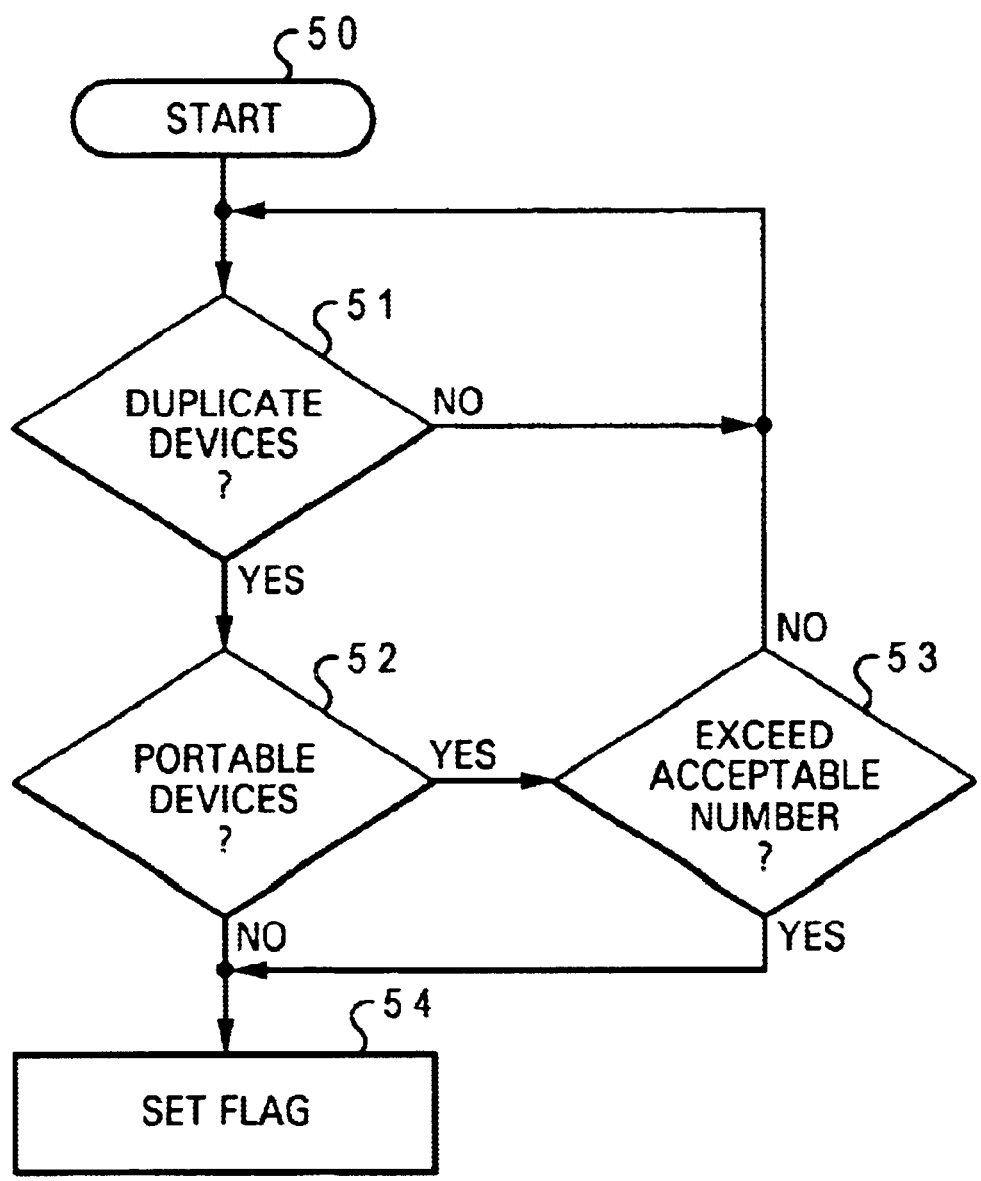
FIG. 4 is a high-level logic flow diagram of a method for detecting a counterfeit device on a non-proprietary bus, in accordance with a preferred embodiment of the present invention.

Similarly, counterfeit devices that were not registered through the proper manner as described above can be detected by periodically checking the information stored in remote server 31. With reference now to FIG. 4, there is illustrated a high-level logic flow diagram of a method for detecting a counterfeit device on a non-proprietary bus, in accordance with a preferred embodiment of the present invention. Starting at block 50, a determination is made as to whether or not a non-proprietary device is registered to more than one gateway controller, as shown in block 51. If the non-proprietary device is registered to more than one gateway controller, another determination is made as to whether the non-proprietary device is a portable or "transient" device, as depicted in block 52. A portable or "transient" device is expected to be moved from vehicle to vehicle. If the non-proprietary device is not a portable or "transient" device, then a flag is set, as illustrated in block 54, to indicate to the vehicle manufacturer that the device registration has been compromised, at least for one non-proprietary device. Otherwise, if the non-proprietary device is a portable or "transient" device, another determination is made as to whether the number of duplication exceeds a predetermined number of acceptable duplication, as shown in block 53. If the number of duplication exceeds a predetermined number of acceptable duplication, such as three, a flag is set, as illustrated in block 54, to indicate to the vehicle manufacturer that there may be a cloning of a registered non-proprietary device by an unauthorized party, and a proper investigation should be initiated.

Although wireless communication device 19 is preferably installed on non-proprietary bus 12, a secure means of communication is established between wireless communication device 19 and gateway controller 20 by encrypting all messages between wireless communication device 19 and gateway controller 20. A unique and relatively long encryption key is used for encrypting any messages to be communicated between wireless communication device 19 and gateway controller 20. Each encrypted message also includes a checksum as part of the encrypted message so that upon decryption, the integrity of the encrypted message can be ascertained. Thus, any other device snooping these communication link between wireless communication device 19 and gateway controller 20 will not be able to "understand" the encrypted messages.

Wireless communication device 19 is also provided with the ability to receive a new encryption key from remote server 31, for example, for the purpose of replacing a defective wireless communication device or gateway controller in a vehicle. There is no provision for changing the encryption key for a particular gateway controller during normal operation, short of replacing the gateway controller. This is because any general update procedure would potentially be a risk due to the fact that once an update procedure were compromised, all gateway controllers would be vulnerable. Although this potential risk can be addressed by having a separate update procedure algorithm for each gateway controller, it would be tantamount to having two encryption keys in one gateway controller or simply an even longer encryption key.

Remote server 31 may be comprised of several server machines, running appropriate server software, which permits a scalable and secure wireless connection with wireless communication device 19. Remote server 31 also stores its private encryption key in a tamper-proof hardware unit such as the 4758 cryptographic coprocessor manufactured by International Business Machines Corporation of Armonk, N.Y. Remote server 31 preferably contains several databases having various information, as follows. A first database indexed by the one-way encrypted ID packets of different gateway controllers, with each entry containing:

i. one-way encrypted ID packets of each gateway controller;
  ii. public encryption keys of each gateway controller;
  iii. a list of non-proprietary bus devices currently registered with each gateway controller, including time of registration;
  iv. one-way encrypted ID packets of each associated wireless communication unit; and
  v. a bit indicating that a corresponding gateway controller ID packet is explicitly invalid due to, for example, improper registration.

A second database indexed by the one-way encrypted ID packets of the non-proprietary bus devices, with each entry containing:

i. one-way encrypted ID packets of each non-proprietary device;
  ii. registration limits;
  iii. a list of gateway controllers for which a non-proprietary bus device is registered;
  iv. a license agreement covering each non-proprietary bus device; and
  v. a bit indicating that a non-proprietary bus device ID packet is explicitly invalid.

A third database indexed by the one-way encrypted ID packets of wireless communication devices, with each entry containing:

i. one-way encrypted ID packets of the wireless communication devices;
  ii. public encryption keys of the wireless communication devices;
  iii. one-way encrypted ID packets of the associated gateway controllers; and
  iv. a bit indicating that a wireless communication device ID packet is explicitly invalid.

A fourth database indexed by license agreements, with each entry containing:

i. a list of one-way encrypted ID packets of manufactured non-proprietary bus devices;
  ii. permission bitmaps appropriate for the non-proprietary bus devices;
  iii. bit indicating if the non-proprietary bus device is a portable device; and
  iv. expected number of concurrent registrations for a non-proprietary bus device.

During message transmission between OEM bus 11 and non-proprietary bus 12, messages originated from a device on OEM bus 11 to a device on non-proprietary bus 12 preferably have priority over messages originated from a device on non-proprietary bus 12 to a device on OEM bus 11. For a message from a device on OEM bus 11 to a device on non-proprietary bus 12, gateway controller 20 determines what the messages type of the message is, and checks to find out if the device on non-proprietary bus 12 is listed in the permitted message bitmap table to receive the message, according to the corresponding permitted message bitmap. If so, the message is forwarded to the device on non-proprietary bus 12.

On the other hand, messages originated from a device on non-proprietary bus 12 to a device on OEM bus 11 have lower priority over messages originated from a device on OEM bus 11 and messages originated from wireless communication device 19. For a message from a device on non-proprietary bus 12 to a device on OEM bus 11, gateway controller 20 again determines what the messages type of the message is, and determines if the device on OEM bus 11 is listed in the permitted messages bitmap table to receive the message, according to the corresponding permitted message bitmap. If so, the message is forwarded to the device on OEM bus 11.

As has been described, the present invention describes an improved method and system for providing control accesses between a device on a non-proprietary bus and a device on a proprietary bus within a data processing system.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for detecting an attempt to install an unauthorized non-proprietary device on a non-proprietary bus that is coupled to a proprietary bus via a gateway controller within a vehicle environment, said method comprising:

in response to a coupling of a non-proprietary device to a non-proprietary bus within a vehicle environment, determining whether or not said non-proprietary device has been registered to more than one gateway controller;

in response to a determination that said non-proprietary device has been registered to more than one gateway controller, determining whether or not said non-proprietary device is a portable device;

in response to a determination that said non-proprietary device is a portable device, determining whether or not a predetermined number of acceptable multiple registrations for a portable device in more than one gateway controller has been exceeded; and in response to a determination that said predetermined number of acceptable multiple registrations for a portable device in more than one gateway controller has been exceeded, setting a flag to indicate said non-proprietary device is not authorized to access a proprietary bus that is coupled to said non-proprietary bus within said vehicle environment.

2. The method of claim 1, wherein said method further includes setting a flag to indicate said non-proprietary device is not authorized to access a proprietary bus that is coupled to said non-proprietary bus, in response to a determination that said non-proprietary device is not a portable device.

3. An apparatus capable of detecting an attempt to install an unauthorized non-proprietary device on a non-proprietary bus that is coupled to a proprietary bus via a gateway controller within a vehicle environment, said apparatus comprising:

means for determining whether or not a non-proprietary device has been registered to more than one gateway controller, in response to a coupling of said non-proprietary device to a non-proprietary bus within a vehicle environment;

means for determining whether or not said non-proprietary device is a portable device, in response to a determination that said non-proprietary device has been registered to more than one gateway controller;

means for determining whether or not a predetermined number of acceptable multiple registrations for a portable device in more than one gateway controller has been exceeded, in response to a determination that said non-proprietary device is not a portable device; and means for setting a flag to indicate said non-proprietary device is not authorized to access a proprietary bus that is coupled to said non-proprietary bus within said vehicle environment, in response to a determination that said predetermined number of acceptable multiple registrations for a portable device in more than one gateway controller has been exceeded.

4. The apparatus of claim 3, wherein said apparatus further includes a means for setting a flag to indicate said non-proprietary device is not authorized to access a proprietary bus that is coupled to said non-proprietary bus, in response to a determination that said non-proprietary device is not a portable device.

5. A computer program product residing on a computer usable medium for detecting an attempt to install an unauthorized non-proprietary device on a non-proprietary bus that is coupled to a proprietary bus via a gateway controller within a vehicle environment, said computer program product comprising:

program code means for determining whether or not a non-proprietary device has been registered to more than one gateway controller, in response to a coupling of said non-proprietary device to a non-proprietary bus within a vehicle environment;

program code means for determining whether or not said non-proprietary device is a portable device, in response to a determination that said non-proprietary device has been registered to more than one gateway controller;

program code means for determining whether or not a predetermined number of acceptable multiple registrations for a portable device in more than one gateway controller has been exceeded, in response to a determination that said non-proprietary device is not a portable device; and program code means for setting a flag to indicate said non-proprietary device is not authorized to access a proprietary bus that is coupled to said non-proprietary bus within said vehicle environment, in response to a determination that said predetermined number of acceptable multiple registrations for a portable device in more than one gateway controller has been exceeded.

6. The computer program product of claim 5, wherein said computer program product further includes a program code means for setting a flag to indicate said non-proprietary device is not authorized to access a proprietary bus that is coupled to said non-proprietary bus, in response to a determination that said non-proprietary device is not a portable device.

7. The method of claim 1, wherein said determining whether or not said non-proprietary device has been registered to more than one gateway controller further includes determining whether or not said non-proprietary device has been registered to more than one gateway controller via a wireless link between a wireless communication device on said non-proprietary bus and a database within a remote server.

8. The method of claim 1, wherein said proprietary bus is an original equipment manufacturer bus.

9. The method of claim 1, wherein said non-proprietary device is a radio.

10. The method of claim 1, wherein said non-proprietary device is a compact disc player.

11. The apparatus of claim 3, wherein said means for determining whether or not said non-proprietary device has been registered to more than one gateway controller further includes mean for determining whether or not said non-proprietary device has been registered to more than one gateway controller via a wireless link between a wireless communication device on said non-proprietary bus and a database within a remote server.

12. The apparatus of claim 3, wherein said proprietary bus is an original equipment manufacturer bus.

13. The apparatus of claim 3, wherein said non-proprietary device is a radio.

14. The apparatus of claim 3, wherein said non-proprietary device is a compact disc player.

15. the computer program product of claim 5, wherein said program code means for determining whether or not said non-proprietary device has been registered to more than one gateway controller further includes program code means for determining whether or not said non-proprietary device has been registered to more than one gateway controller via a wireless link between a wireless communication device on said non-proprietary bus and a database within a remote server.

16. The computer program product of claim 5, wherein said proprietary bus is an original equipment manufacturer bus.

17. The computer program product of claim 5, wherein said non-proprietary device is a radio.

18. The computer program product of claim 5, wherein said non-proprietary device is a compact disc player.

* * * * *